(12) United States Patent
Tolbert et al.

(10) Patent No.: US 8,399,057 B2
(45) Date of Patent: Mar. 19, 2013

(54) ORDERED VERTICALLY ORIENTED POROUS INORGANIC FILMS PRODUCED THROUGH SOLUTION PROCESSING

(75) Inventors: Sarah H. Tolbert, Los Angeles, CA (US); Erik K. Richman, Gibsonia, PA (US)

(73) Assignee: The Regents of the University of California, Oakland, CA (US)

( * ) Notice: Subject to any disclaimer, the term of this patent is extended or adjusted under 35 U.S.C. 154(b) by 982 days.

(21) Appl. No.: 11/449,465

(22) Filed: Jun. 8, 2006

(65) Prior Publication Data
US 2006/0278158 A1    Dec. 14, 2006

Related U.S. Application Data

(60) Provisional application No. 60/688,615, filed on Jun. 8, 2005.

(51) Int. Cl.
*B05D 3/00* (2006.01)
(52) U.S. Cl. ........ 427/271; 427/240; 427/256; 427/259; 427/472; 264/414; 264/425; 264/628; 430/270.1; 430/272.1; 430/325
(58) Field of Classification Search .................. 427/256, 427/240, 259, 271, 472; 264/414, 425, 628; 430/270.1, 272.1, 325
See application file for complete search history.

(56) References Cited

U.S. PATENT DOCUMENTS

| | | | | |
|---|---|---|---|---|
| 5,958,367 | A * | 9/1999 | Ying et al. | 423/701 |
| 6,592,764 | B1 * | 7/2003 | Stucky et al. | 210/660 |
| 2002/0046682 | A1 * | 4/2002 | Fan et al. | 106/287.11 |
| 2002/0097297 | A1 * | 7/2002 | Skinner et al. | 347/46 |
| 2003/0157248 | A1 * | 8/2003 | Watkins et al. | 427/256 |
| 2004/0028809 | A1 * | 2/2004 | Bein et al. | 427/240 |
| 2006/0240590 | A1 * | 10/2006 | Mountziaris et al. | 438/99 |

OTHER PUBLICATIONS

Patrick P. Naulleau. "Relevance of mask-roughness-induced printed line-edge roughness in recent and future extreme-ultraviolet lithography tests" Applied Optics Jul. 10, 2004 D vol. 43, No. 20.

Yang-Kyu Choi, Tsu-Jae King, and Chenming Hu. "A Spacer Patterning Technology for Nanoscale CMOS" IEEE Transactions on Electron Devices, vol. 49, No. 3, Mar. 2002.

M. Lindeberg, K. Hjort. "A comprehensive study of ion track enabled high aspect ratio microstructures in flexible circuit boards" Microsystem Technologies 10 (2004) 608-621.

S Metz, C Trautmann, A Bertsch and Ph Renaud. "Polyimide microfluidic devices with integrated nanoporous filtration areas manufactured by micromachining and ion track technology" J. Micromech. Microeng. 14 (2004) 324-331.

C.X. Xu, X. S. Zhang, and X. W. Sun. "Preparation of Porous Alumina by Anodization" Journal of Metastable and Nanocrystalline Materials, vol. 23, 2005, pp. 7578.

(Continued)

*Primary Examiner* — Michael Cleveland
*Assistant Examiner* — Xiao Zhao
(74) *Attorney, Agent, or Firm* — Ballard Spahr LLP (57) ABSTRACT

Porous films with straight pores oriented normal to the plane of the films are produced through solution processing techniques. The production takes advantage of inorganic-surfactant or inorganic-polymer co-assembly and a patterned substrate. The patterned substrate, which is also produced via solution phase self-assembly, forces vertical orientation in a hexagonal cylinder system with no practical limits in substrate size or type. This provides a route to vertically oriented inorganic pores with a pitch ranging from 3 nm to over 15 nm and pore sizes ranging from 2 nm to over 12 nm. The size is tuned by choice the choice of organic templating agents and the deposition conditions. The pores can be produced with or without a capping layer which can be used to seal the nanopores.

20 Claims, 7 Drawing Sheets

OTHER PUBLICATIONS

Rachel A. Segalman. "Patterning with block copolymer thin films" Materials Sdence and Engineering R 48 (2005) 191-226.

Unyong Jeong, Du Yeol Ryu, Jin Kon Kim, Dong Ha Kim, Thomas P. Russell, Craig J. Hawker. "Volumen Contractions Induced by Crosslinking: A Novel Route to Nanoporous Polymer Films" Adv. Mater. 2003, 15, No. 15 pp. 1247-1250.

Yao Lin, Alexander Boker, Jinbo He, Kevin Sill, Hongqi Xiang, Clarissa Abetz, Xuefa Li, Jin Wang, Todd Emrick, Su Long, Qian Wang, Anna Balalzs, and Thomas P. Russell. "Self directed self assembly of nanoparticle/copolymer mixtures" Nature, vol. 434, Mar. 3, 2005, pp. 55-59.

Miri Park, P.M. Chaikin, Richard A. Register, Douglas H. Adamson. "Large area dense nanoscale patterning of arbitrary surfaces" Applied Physics Letters—Jul. 9, 2001—vol. 79, Issue 2, pp. 257-259.

David Grosso, Florence Cagno, Galo J. de A. A. Soler Iilia, Eduardo L. Crepaldi, Heinz Amenitsch, Aline Brunet-Bruneau, Alexi Bourgeois, and Clement Sanchez. "Fundamentals of Mesostructuring Through Evaporation-Induced Self Assembly" Adv. Funct. Mater. 2004, 14, No. 4, April.

Ji Man Kim, Yasuhiro Sakamoto, Young Kyu Hwang, Young-Uk Kwon, Osamu Terasaki, Sang-Eon Park, Galen D. Stucky. "Structural Design of Mesoporous Silica by Micelle-Packing Control Using Blends of Amphilic Block Copolymers" J. Phys. Chem. B, 2002, 106, pp. 2552-2558.

C. J. Brinker, Yunfeng Lu, Alan Sellinger, and Hongyou Fan. "Evaporation-Induced Self-Assembly: Nanostructures Made Easy" Adv. Mater. 1999, 11, No. 7 pp. 579-585.

Yusuke Yamauchi, Makoto Sawada, Takashi Noma, Hidenosuke Ito, Seiichi Furumi, Yoshio Sakka, and Kazauyuki Kuroda. "Orientation of mesochannels in continuous mesoporous silica films by a high magnetic field" Journal of Materials Chemistry, 2005, 15, pp. 1137-1140.

Rainer Pelzer, Cecile Gourgon, Stefan Landis, Paul Kettner. "Nanoimprint Lithography Full wafer Replication of Nanometer Features" Micro- and Nanotechnology: Materials, Processes, Packaging, and Systems II, Feb. 2005, pp. 256-259.

Sarah H. Tolbert, Ali Firouzi, Galen D. Stucky, Bradley F. Chmelka. "Magnetic Field Alignment of Ordered Silicate-Surfactant Composites and Mesoporous Silica" Science, vol. 278, 1997, pp. 264-268.

Hirokatsu Miyata, Kazuyuki Kuroda. "Formation of a Continous Mesoporous Silica Film with Fully Aligned Mesochannels on a Glass Substrate" Chem. Mater., 2000, 12, pp. 49-54.

Peter C. A. Alberius, Karen L. Frindell, Ryan C. Hayward, Edward J. Kramer, Galen D. Stucky, and Bradley Chmelka. "General Predictive Synthesis of Cubic, Hexagonal, and Lamellar Silica and Titania Mesostructured Thin Films" Chem. Mater. 2002, 14, pp. 3284-3294.

Dongjuan Zhao, Peidong Yang, Nick Melosh, Jianglin Feng, Bradley F. Chmelka, and Galen Stucky. "Continuous Mesoporous Silica Films with Highly Ordered Large Pore Structures" Adv. Mater. 1998, 10, No. 16, pp. 1380-1385.

* cited by examiner

ORDERED VERTICALLY ORIENTED POROUS INORGANIC FILMS PRODUCED THROUGH SOLUTION PROCESSING

CROSS REFERENCE TO RELATED APPLICATION

This application claims the benefit of U.S. Provisional Application No. 60/688,615 filed Jun. 8, 2005 and which is incorporated herein by reference.

STATEMENT REGARDING FEDERALLY SPONSORED RESEARCH OR DEVELOPMENT

This invention was sponsored by: the Office of Naval Research under Grant Nos. N00014-04-1-0410 and N00014-01-1-0737; National Science Foundation Grant No. CHE-0527015; and National Science Foundation-Integrative Graduate Education and Research Traineeship Grant No. DGE 0114443. The Government may have certain rights to this invention.

FIELD OF THE INVENTION

The field of the invention is porous films with straight pores oriented normal to the plane of the films.

BACKGROUND OF THE INVENTION

Porous films with straight pores oriented normal to the plane of the films are a desirable geometry for a wide range of applications. Prior to this invention the state of the art for producing accessible vertical pores consisted of: optical lithography, e-beam serial lithography, ion track etching, anodic alumina, aligned diblock copolymers, and various surfactant or polymer template materials including magnetic field alignment of silica mesopores. Bicontinuous cubic pores do not have anisotropy between the in-plane and out of plane directions, but have homogenous porosity with a component that is normal to the substrate. Optical lithography is limited to features above 30 nm in pitch for EUV techniques [1,2]. E-beam lithography is a serial method. The rest are parallel processes like that described here, but each has drawbacks.

Track etching uses ion beams of heavy, high energy ions to irradiate a sample. The samples are dielectrics and semi-insulating materials like kapton with no polycrystallinity; the technique is most often applied onit to polymer films. The preferential etching of degraded material in the path of the ion allows cylindrical column pores to be etched out of the target. Single pores can be 6 nm or larger and have aspect ratios in excess of 1000. While it has no order, the density of pores is controlled by exposure time and feature density can reach $1014/cm^2$ [3,4]. Throughput with this technique is limited by the collimation of the ion beam because of its reliance on ion trajectory.

Aluminum can be anodically etched to produce vertical alumina pores. The process produces a disordered pore structure with diameters between 6 nm and 200 nm that is thermally stable to 800° C. As a film, this process is only able to produce pores in aluminum and only on conductive substrates [5].

Block copolymers are two or more polymers covalently bound at one point. They microphase segregate based upon the miscibility of the blocks. This can be used to produce a material with hexagonal symmetry. In order for the cylinders to be vertically aligned there are several methods that have been applied. Heating above the glass transition in the presence of an electric field allows the system to reorganize locally about a preferred axis defined by the electric field. Specially treated surfaces that have equal contact angles to both volumes of a diblock copolymer allow orientation to be defined by the thickness of the film. When the thickness is n+½ the pore to pore distance, and the polymer is heated above the glass transition temperature, frustration of the interface leads to vertical orientation of the volumes [6]. This technique only works for small aspect ratios. Recently, addition of nanoparticles to a melt has been shown to equalize surface energy and produce high aspect ratio volumes. Polymers are limited to temperatures below their melting points which decrease with size, limiting the practical diameters. To get small diameter cylinders, it is necessary to use small polymers. Microphase segregation only produces ordered phases above a minimum product of the interaction energy and the polymerization number. This results in a practical lower limit on cylinder diameters to about 20 nm. Once the cylinder is oriented, differential etching or crosslinking is used to make a pore [7, 8, 9].

Figure 1:
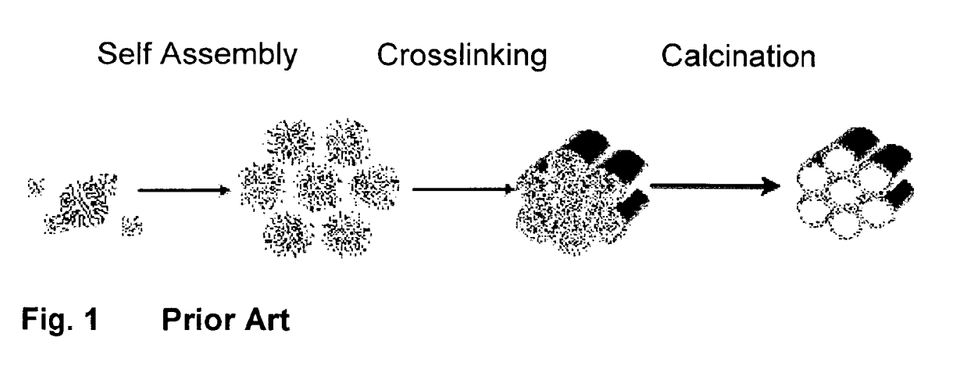
FIG. 1 is a schematic representation of the self assembly of mesopore materials in accordance with prior art.

Templated inorganic systems rely on the interaction of a templating micelle (surfactant or polymer) and a polymerizable inorganic (FIG. 1). They self assemble into a matrix which is inherently ordered and can be made porous by removing the organic component. Bicontinuous cubic phases can be produced [10, 11, 12]. Once calcined, these have a 3D pore system that is open to the top and the bottom of the film. There is no orientation control and the pores are only connected through small necks between the cubic sites. Generally, templated inorganic systems have high temperature stability and a wide variety of materials are available for the matrix, from conductors to insulators. A 2-D hexagonal system produces long cylindrical pores. Unfortunately, on a homogenous substrate they form pores only parallel to the substrate. To change this orientation, it is necessary to use magnetic fields in the range 10 T or greater [13,14]. In-plane orientation can also be controlled through the substrate, but until now it has only been possible to control orientation parallel to the substrate [15].

Figure 2:
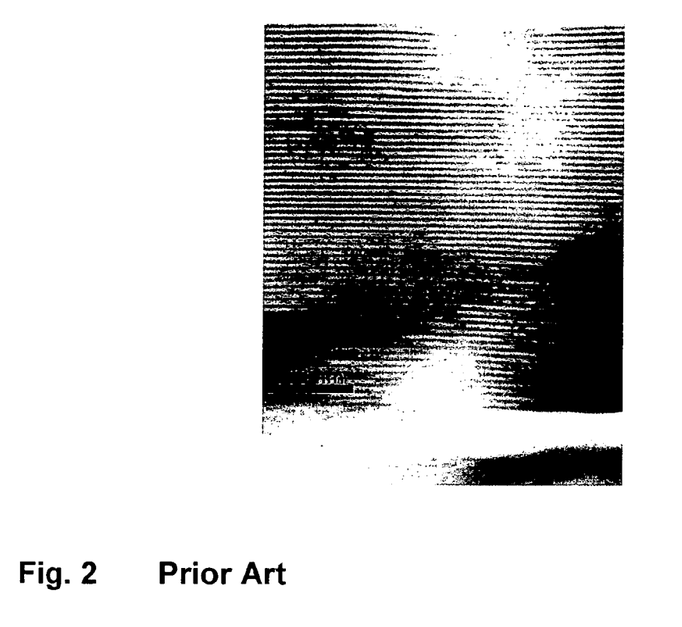
FIG. 2 is a cross-section transmission electron microscope (TEM) image of hexagonal silica in accordance with prior art.

Ordered inorganic pore systems can be produced by self assembly using an organic polymer or surfactant template and inorganic matrix precursors as in FIG. 1. Unfortunately, hexagonal pores produced by self assembly on homogenous substrates produce horizontal pores as in FIG. 2.

BRIEF SUMMARY OF THE INVENTION

In accordance with the present invention, porous films with straight pores oriented normal to the plane of the films can be simply produced through solution processing techniques, and which can be applied to any ordered nanoporous inorganic material that can be produced by polymer or surfactant templating. The production takes advantage of inorganic-surfactant or inorganic-polymer co-assembly and a patterned substrate. The patterned substrate, which is also produced via solution phase self-assembly, forces vertical orientation in a hexagonal cylinder system with no practical limits in substrate size or type. This provides a route to vertically oriented inorganic pores with a pitch ranging from 3 nm to over 15 nm and pore sizes ranging from 2 nm to over 12 nm. The size is tuned by the choice of organic templating agents and the deposition conditions. The pores can be produced with or without a capping layer which can be used to seal the nanopores.

More specifically, a method is provided for producing an inorganic film having vertically oriented pores normal to the plane of a surface of the film in which a pattern of components of contrasting hydrophobicity and hydrophilicity is formed on the film surface. An inorganic/organic composite is grown on the patterned surface whereby the composite can conform to the surface pattern and form vertically oriented cylinder structures, following which the composite is treated to form a pattern of pores corresponding in location to the pattern of components.

In particular embodiments, the surface pattern components are formed by self-assembly, crosslinking, then calcining to provide a flat patterned surface, and the nanoporous layer is similarly formed by self-assembly and crosslinking to form a nanostructure composite, and calcining or other methods to selectively remove the template and generate a porous material. In specific embodiments, the vertically oriented pore structures are arranged in a hexagonal pattern and the surface pattern is generated by the top surface of a cubic self-assembled material with a close lattice match to the hexagonal composite.

The ordered, vertically oriented [porous inorganic films produced by the methods of this invention are novel. The method can be extended to any polymer or surfactant templated system where hexagonal nanoporous materials can be produced. We have shown that vertical pores can be produced either from silica or titania using the same method of hexagonal-on-cubic interfacial nucleation.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

In accordance with this invention, vertical pores can be produced via solution processing using a pattern of contrasting hydrophobicity, and/or hydrophilicity to direct the orientation of the liquid crystalline inorganic/organic precursor. Preferably the film has a pattern of hydrophobic domains or patches on a hydrophilic film surface. A pattern of hydrophilic domains on a hydrophobic film surface can also be used in a system based on inverse micelle self assembly. Thus, the pattern preferably has contrasting patches that match the hydrophobic and hydrophilic components of the final composite film. For aligning a composite composed of hexagonally arranged cylinders, it is necessary to have a hexagonal surface pattern with a close lattice match to the composite. Since this is a surface directed orientation, roughness of the pattern must also be minimized.

Patterns can be produced in many ways. Monolayers of nanoparticles make hexagonal patterns. Block copolymers can also be used to make a hexagonal pattern. Lithography using PDMS stamps can make a hexagonal pattern of discs [16]. While all of these methods should work, they all may have some problems, either with making very small patterns, or make highly regular patterns over large areas.

Figure 3:
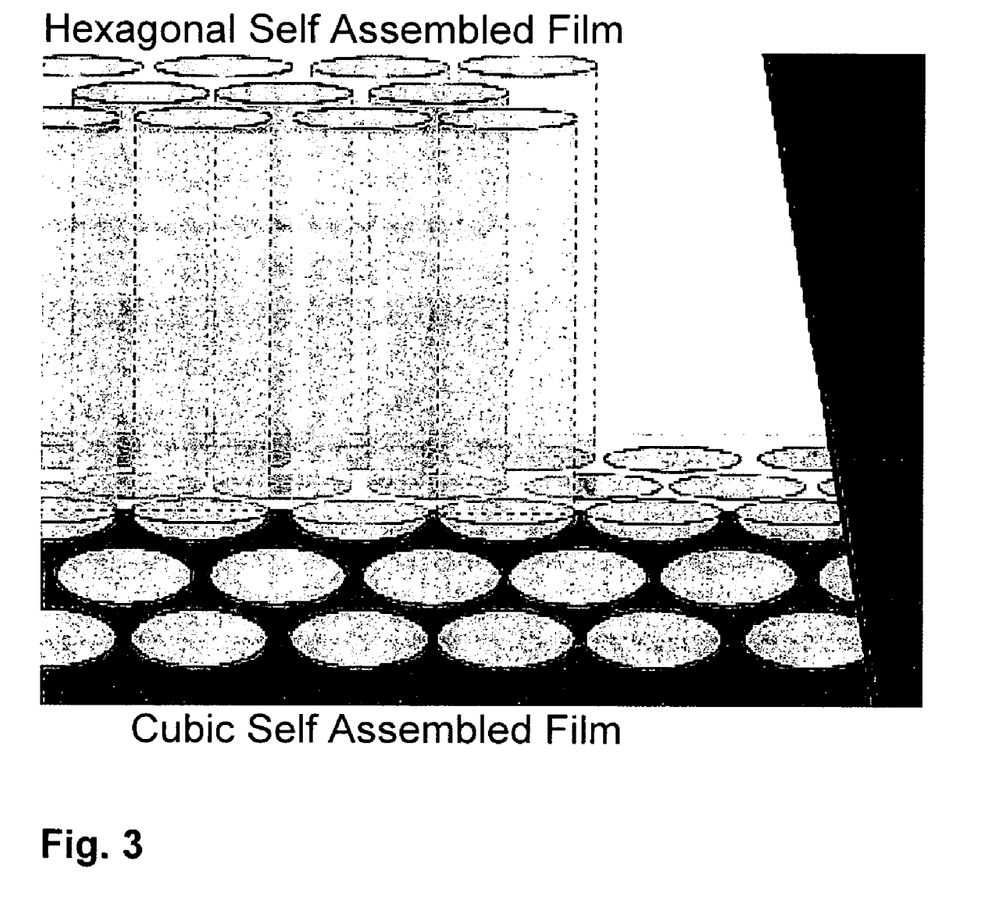
FIG. 3 depicts a scheme for vertical pore growth in accordance with the present invention.

Another way to produce a hexagonal surface pattern is to use a (111) oriented cubic self assembled inorganic-organic composite that can be slowly crosslinked to provide a robust ultraflat surface with a hexagonal interface. Such orientated cubic systems can be produced on any reasonably flat substrate such as glass, quartz, indium tin oxide, fluorine doped tin oxide, silicon, and plastic. For optimal adhesion to the plastic, a very thin titanium adhesion layer can be used. Our results show that clearly any substrate with an oxide top surface can be employed, and in some cases, non-oxide surfaces can also be used. This is shown in FIG. 3, which depicts a scheme for vertical pore growth in accordance with the present invention. The cubic pattern used must be matched to the hexagonal film system to be oriented. Production of such an oriented cubic film is compatible with deposition via spin casting, dip casting, drop casting and inkjet deposition.

To produce vertically oriented pores, a hexagonal honeycomb structured surfactant or polymer templated inorganic/organic composite is then grown on top of the patterned surface under growth conditions where the hexagonal composite can conform to the surface pattern. For example, the films can be formed under conditions where inorganic condensation proceeds slowly. For silica pores this requires deposition from an ethanolic solution with a pH near the isoelectric point of silica (~2). This pH is used reduce the rate of silica condensation, thus giving the system time to rearrange into an orientation that is most compatible with the patterned substrate before the hexagonal structure is locked into place.

Examples of specific surfactants that have been used to template the structure include Brij 58, Brij 56, or Cetyltriethylammonium bromide (CTAB). This is by no means an exhaustive list and based on reported properties, any quaternary ammonium surfactant like CTAB or any polyethylene oxide based surfactant (like the Brij series) can be used. Specific polymers that can be used to template the structures include Pluronics such as P123, P103, or F127 from BASF, all tri-block-copolymers with minimal capital costs. The di-block copolymer KLE (kraton liquid-block-polyethylene oxide) has also been shown to template these materials. Therefore, any di- or tri-block copolymer with a polyethylene oxide (or polyethylene glycol) block can be used. Moreover, we have shown that traditional homopolymers with quaternary ammonium side change can be used to template these materials. This includes semiconducting polymers with conjugated backbones.

A wide range of materials can be used to make the hexagonal material including almost any oxide (silica, titania, vanadia, zirconia, iron oxide, niobium oxide, tin oxide, manganese oxide, and alumina). Semiconducting templated materials can be produced using zintl clusters as building blocks. Systems that can be aligned include germanium, tin-germanium, silicon-germanium, platinum coupled tin tellurides, tin selenides, tin sulfides, germanium tellurides, germanium sulfides and germanium selenides. Periodic mesoporous organosilicas can be used. These are porous materials with organic groups in the walls including biphenylene, non-symmetrical 1,3-phenylene, naphthalene and terphenylene, methylene, ethane, ethylene, benzene, thiophene, acetylene, ferrocene.

The following examples will illustrate the invention.

EXAMPLE 1

Figure 4:
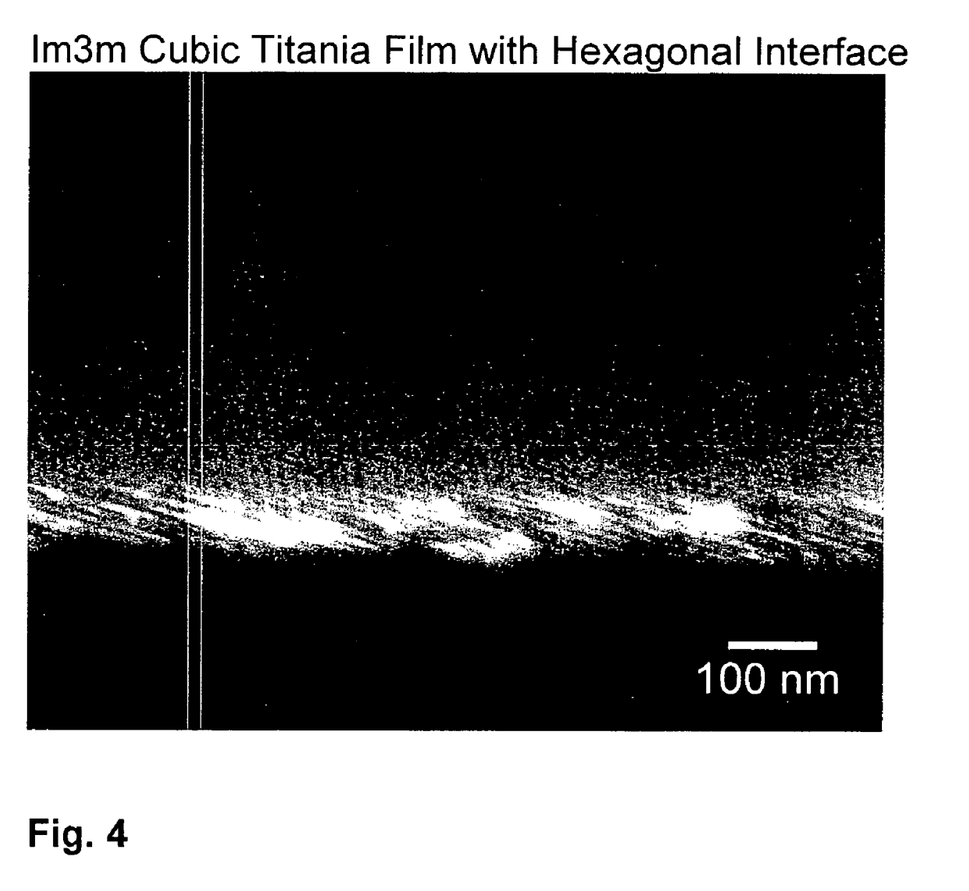
FIG. 4 shows a cross-section scanning electron microscope (SEM) image of cubic titania film produced in accordance with this invention, with a hexagonal interface.

Referring to FIG. 4, which shows a cross-section SEM image of cubic titania film produced in accordance with this invention, a substrate pattern was generated by cubic mesoporous titania and a slowly crosslinked 2D hexagonal silica film. The solution for the cubic titania was made using a protocol developed by Alberius et al. [17]. In an argon purged container, 4.2 grams of tetraethylorthotitanate was mixed with 3.2 grams of concentrated HCl. After 10 minutes, 1 gram of Pluronic P123 dissolved in 14 grams of ethanol was added. The solution was stirred for 15 minutes and applied via dip casting at 2 cm/minute and the resulting film was aged for 4 days between $-10°$ C. and $10°$ C. After the aging was complete, the film was crosslinked by heating it first at $60°$ C. for 24 hours, then at $130°$ C. for 24 hours. The film was calcined with a 6 hour ramp to $350°$ C., held for 1 hour and a 6 hour ramp to room temperature. The substrate has a pattern with 15 nm pitch and appropriate hydrophobicity/hydrophilicity contrast. The rms roughness is under 1 nm as determined by an atomic force microscope.

The 2D hexagonal silica was made from a protocol adapted from Stucky et al. [18]. First, 6.65 grams of Pluronic P123 and 0.8 gram of tetramethylammonium chloride was dissolved in 100 mL of ethanol. Second, 16.65 grams of tetraethylorothosilicate and 12 grams of pH2 HCl are mixed in 50 mL of ethanol. Both solutions are stirred at $60°$ C. for 1 hour. They are combined and stirred for 2 hours at room temperature. The solution was applied by dip casting at 2 cm/min to the titania coated substrate at 50% relative humidity. The film was aged for 1 day at room temperature and 50% relative humidity, and hydrothermally treated for 1 day at $60°$ C. The film was calcined with a 9 hour ramp to $450°$ C., held for 4 hours, and cooled with a 9 hour ramp to room temperature.

Figure 5:
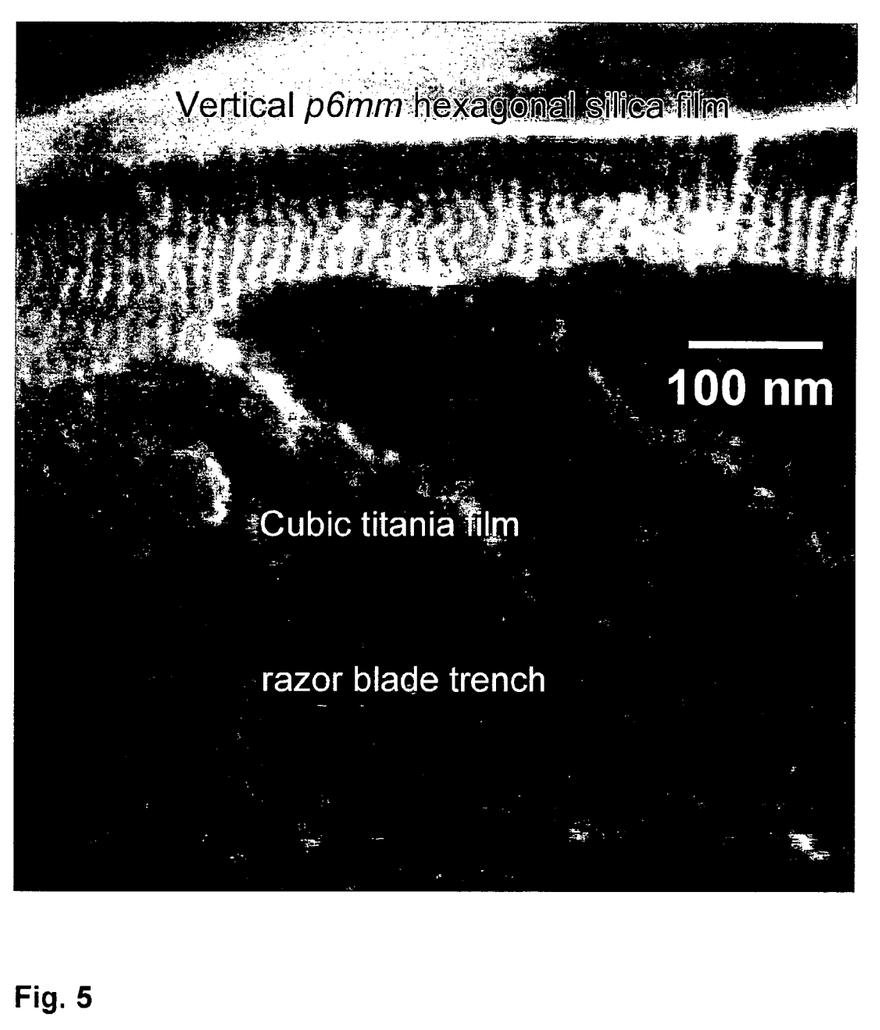
FIG. 5 shows a cross section SEM image of a film produced in accordance with this invention, with hexagonal silica pores aligned by a cubic titania porous substrate.

FIG. 5 shows a cross section SEM image of the end result in which a silica film was produced with 15 nm pitch and 10 nm diameter pores oriented vertically on the cubic titania substrate. In this example, the pores are covered in a lamellar layer. A slight modification of this procedure can produce pores that are open on the top so that the vertical pores can be made either sealed or unsealed.

EXAMPLE 2

Figure 6:
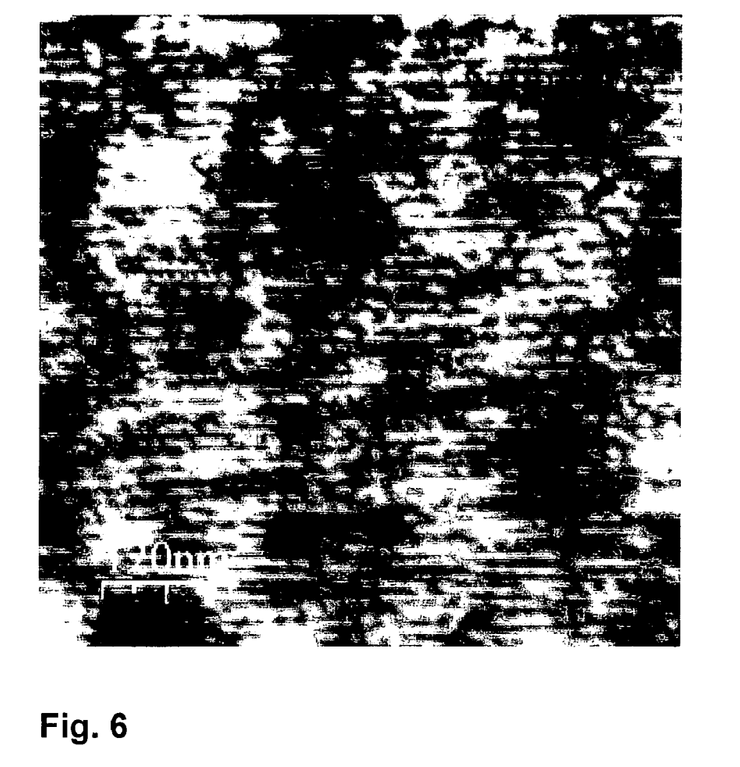
FIG. 6 shows an AFM image of a film produced in accordance with this invention, with hexagonal silica pores aligned by a cubic titania porous substrate and open to the surface.
Figure 7:
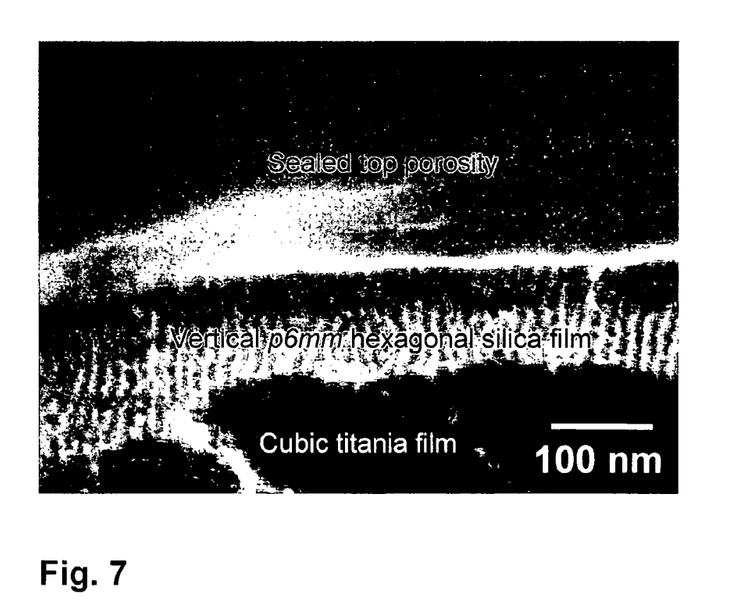
FIG. 7 shows a SEM image of a vertically oriented silica film where the top porosity is sealed by a thin continuous silica layer.

The procedure in Example 1 produces a film with a capping layer. The top surface of such a film is shown in FIG. 7. To produce a film without the capping layer, the tetramethylammonium chloride is left out of the synthesis. This will generate a film with slightly less straight pores, but open top porosity, as shown in FIG. 6.

EXAMPLE 3

The procedure of Example 1 can be conducted, following which the top layer can be removed with a plasma etch to produce open pores.

The foregoing Examples use a two step process that first involves formation of a cubic sub-film, followed by generation of a hexagonal film with vertical pore orientation using the top surface of the cubic film as a patterned nucleation site. The method has been extended to produce vertically oriented hexagonal pores in a single pot synthesis. The method works by producing a film that at the border of the cubic and hexagonal stability fields (which is controlled by the relative concentrations of the organic template and the inorganic precursor). If a composition is chosen that can not stably produce a pure hexagonal or a pure cubic phase, then multiple phases can be produced in a single film. Using a precursor solution that has a reagent composition chosen between the cubic and hexagonal stable regimes allows a film to be produced with both phases present. Spontaneous phase separation then yields a film with hexagonally packed cylinders growing from a cubic substrate similar to the two-pot synthesis where the cubic substrate is prepared separately in advance. The following examples illustrates one pot synthesis of vertically oriented nanoporous titania films.

EXAMPLE 4

Figure 8:
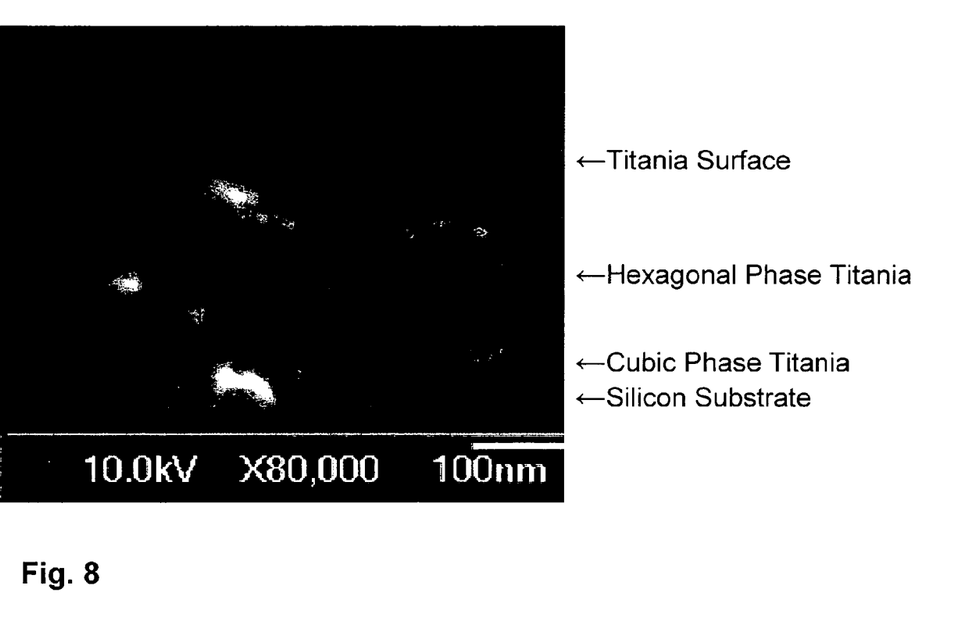
FIG. 8 shows a cross section SEM image of a film produced in an extension of this invention with a single film that phase separates into hexagonal vertical pores and a cubic substrate.

In an argon purged container, 4.2 grams of tetraethylorthotitanate was mixed with 3.2 grams of concentrated HCl. After 10 minutes, 1.65 grams of Pluronic P103 dissolved in 20 grams of ethanol was added. The solution was stirred for 75 minutes. Films were formed through dip-coating on a silicon substrate using a withdrawal rate of 2 cm/minute. The resulting film was aged for 2 days between $-20°$ C. and $10°$ C. After the aging was complete, the film was crosslinked by heating it first at $60°$ C. for 24 hours, then at $130°$ C. for 24 hours. The film was calcined by heating to $350°$ C. over the course of 6 hours, holding for 1 hour at $350°$ C. and then ramping back down to room temperature over the course of another 6 hours. A film produced in accordance with this example is shown in FIG. 8 in which hexagonal and cubic regimes are labeled.

EXAMPLE 5

Figure 9:
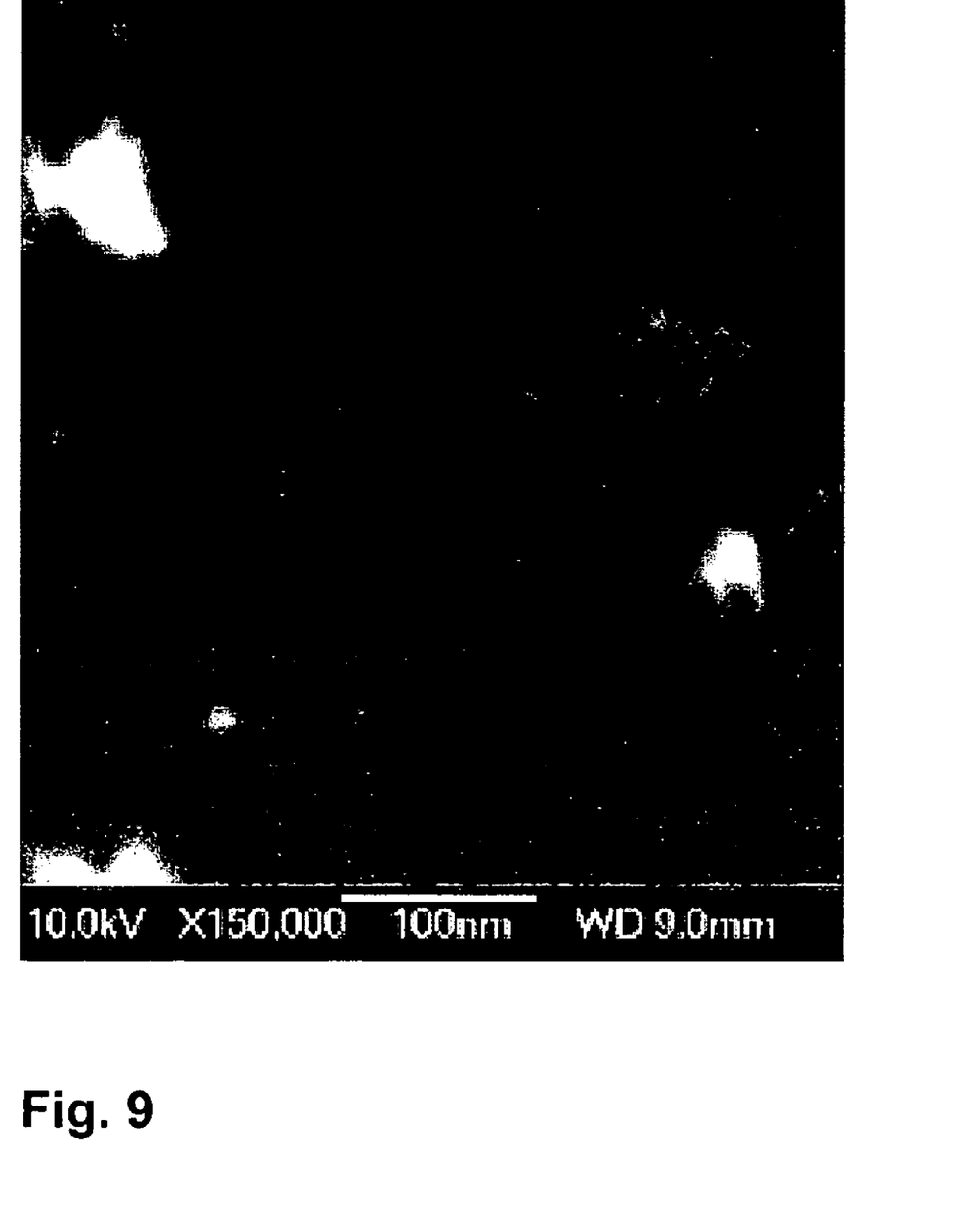
FIG. 9 shows a cross section SEM image of a film produced in accordance with this invention, with hexagonal titania pores aligned by a cubic titania porous substrate.

The procedure of Example 4 was generally followed except that hexagonal titania was used instead of hexagonal silica. A cross section SEM image of the film so produced is shown in FIG. 9 wherein hexagonal titania pores are aligned by a cubic titania porous substrate.

Existing practices are limited in pitch size scale, material versatility, aspect ratio, thermal stability, applicable substrates and/or application area. Optical lithography state of the art is limited to above 30 nm for EUV and requires major capital investment for the light source and patterns. E-beam lithography is comparable size scale to that produced here, but is a serial process which is impractical for large areas and a similarly large capital investment. Ion track etching has extremely high aspect ratio and pore density. It does not require a mask, and is able to operate on flexible substrates, but organic polycrystalline materials do not work and the method is usually applied only to pure organic systems such as polymer films. The other downside is that there is no order except that imposed by a mask and it requires a collimated ion source which limits the area of application. The resulting material is also weak due to disordered perforation. The anodic alumina technique is limited to just alumina, and requires a conductive substrate with an applied electric field. Bicontinuous cubic liquid crystal systems have similar pitch ranges but have isotropic, 3-dimensional porosity with no aspect ratio. Magnetic alignment of self assembled liquid crystals is limited to small areas (i.e. an area that can fit inside the bore of a 10 T magnet) and requires large capital investment. It also does not produce perfect alignment.

In contrast to these prior systems, the novel use of a cubic self assembled liquid crystal system for a substrate to align a hexagonal self assembled liquid crystal system allows for features between 2 and 20 nm in size and pitch defined by choice of templating micelle agent. Self assembled systems offer unparalleled control over material composition and physical properties including high temperature stability and tunable electronic, catalytic, and optical properties. Also, the inherent ordering of the system allows for applications like memory, which require registry and none of the brittleness associated with a lack of lattice. The practical limits to application area are generated only by the size of a container in dip coating, the storage area for aging, and an oven for calcination. The base substrate does not even need to be terribly flat as the cubic sub-phase can even out impurities. Capital investment is also minimal with no exotic light or ion sources.

A wide range of applications are possible for vertically oriented nanoporous films, most of which take advantage of facile diffusion of molecules into pores of this orientation. The most straightforward of these applications involves separation or ultrafiltration in which solutions containing molecules or colloids are passed through a membrane made of templated vertical pores. Other applications take advantage of the fact that species diffused into such pores are accessible for electrical or magnetic contact from the top and bottom surfaces of the film. This opens up a very broad range of applications in electronic materials including devices such as transistors, diodes, light emitting diodes, batteries, solar cells, memory, and even logic switches. In a typical application, a wire is produced in the vertical pore by deposition or diffusion into the pores. Simple wires that can currently be produced in related pores systems include metals, inorganic semiconductors, and semiconducting polymers. Because of the vertical pore orientation, both top and bottom electrical contact can be made to these wires. Magnetic bits can be produced in a similar manner by filling the pores with wires made of ferrous metals or by filling the pores with stacks of magnetic nanocrystals. Importantly, because this templating method can be applied to a range of materials, applications can take advantage of both the magnetic and electronic properties of the material filling the pores and the properties of the inorganic framework itself, which can be insulating, semiconducting, or conducting Other hexagonal inorganic materials can be aligned in accordance with this invention. These materials include other oxides phases, zintl cluster based inorganic frameworks, and periodic meso porous organosilicas. The pores can be filled with metals, electroactive and photo active polymers, semiconductors and nanoparticles. The vertical pores can be used for the production of nanowire field effect transistors, nanoscale light emitting diodes, nanowire lasers, and magnetic storage based on stacked magnetic nanocrystals.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments described in the specification. As one of ordinary skill in the art will readily appreciate from the disclosure of the present invention, means and methods, or steps, presently existing or later to be developed that perform substantially the same function or achieve substantially the same result as the corresponding embodiments described herein may be utilized according to the present invention. Accordingly, the appended claims are intended to include within their scope such means, methods, and steps.

REFERENCES

1. Patrick P. Naulleau. "Relevance of mask-roughness-induced printed line-edge roughness in recent and future extreme-ultraviolet lithography tests" APPLIED OPTICS 10 Jul. 2004 D Vol. 43, No. 20 D
2. Yang-Kyu Choi, Tsu-Jae King, and Chenming Hu. "A Spacer Patterning Technology for Nanoscale CMOS" IEEE TRANSACTIONS ON ELECTRON DEVICES, VOL. 49, NO. 3, March 2002.
3. M. Lindeberg, K. Hjort. "A comprehensive study of ion track enabled high aspect ratio microstructures in flexible circuit boards" Microsystem Technologies 10 (2004) 608-621.
4. S Metz, C Trautmann, A Bertsch and Ph Renaud. "Polyimide microfluidic devices with integrated nanoporous filtration areas manufactured by micromachining and ion track technology" J. Micromech. Microeng. 14 (2004) 324-331.
5. C. X. Xu, X. S. Zhang, and X. W. Sun. "Preparation of Porous Alumina by Anodization" Journal of Metastable and Nanocrystalline Materials, Vol. 23, 2005, pp. 7578.
6. Rachel A. Segalman. "Patterning with block copolymer thin films" Materials Science and Engineering R 48 (2005) 191-226.
7. Yao Lin, Alexander Boker, Jinbo He, Kevin Sill, Hongqi Xiang, Clarissa Abetz, Xuefa Li, Jin Wang, Todd Emrick, Su Long, Qian Wang, Anna Balalzs, and Thomas P. Russell. "Self directed self assembly of nanoparticle/copolymer mixtures" Nature, Vol 434, 3 Mar. 2005, pp 55-59.
8. Unyong Jeong, Du Yeol Ryu, Jin Kon Kim, Dong Ha Kim, Thomas P. Russell, Craig J. Hawker. "Volumen Contractions Induced by Crosslinking: A Novel Route to Nanoporous Polymer Films" Adv. Mater. 2003, 15, No. 15 pp. 1247-1250.
9. Miri Park, P.M. Chaikin, Richard A. Register, Douglas H. Adamson. "Large area dense nanoscale patterning of arbitrary surfaces" Applied Physics Letters —Jul. 9, 2001— Volume 79, Issue 2, pp. 257-259
10. David Grosso, Florence Cagno, Galo J. de A. A. Soler lilia, Eduardo L. Crepaldi, Heinz Amenitsch, Aline Brunet-Bruneau, Alexi Bourgeois, and Clement Sanchez. "Fundamentals of Mesostructuring Through Evaporation-Induced Self Assembly" Adv. Funct. Mater. 2004, 14, No. 4, April.
11. Ji Man Kim, Yasuhiro Sakamoto, Young Kyu Hwang, Young-Uk Kwon, Osamu Terasaki, Sang-Eon Park, Galen D. Stucky. "Structural Design of Mesoporous Silica by Micelle-Packing Control Using Blends of Amphilic Block Copolymers" J. Phys. Chem. B, 2002, 106, pp. 2552-2558.
12. C. J. Brinker, Yunfeng Lu, Alan Sellinger, and Hongyou Fan. "Evaporation-Induced Self-Assembly: Nanostructures Made Easy" Adv. Mater. 1999, 11, NO.7 pp579-585.
13. Yusuke Yamauchi, Makoto Sawada, Takashi Noma, Hidenosuke Ito, Seiichi Furumi, Yoshio Sakka, and Kazauyuki Kuroda. "Orientation of mesochannels in continuous mesoporous silica films by a high magnetic field" Journal of Materials Chemistry, 2005, 15, pp. 1137-1140.
14. Sarah H. Tolbert, Ali Firouzi, Galen D. Stucky, Bradley F. Chmelka. "Magnetic Field Alignment of Ordered Silicate-Surfactant Composites and Mesoporous Silica" Science, Vol 278, 1997, pp 264-268.
15. Hirokatsu Miyata, Kazuyuki Kuroda. "Formation of a Continous Mesoporous Silica Film with Fully Aligned Mesochannels on a Glass Substrate" Chem. Mater., 2000, 12, pp 49-54.

16. Rainer Pelzer, Cecile Gourgon, Stefan Landis, Paul Kettner. "Nanoimprint Lithography Full wafer Replication of Nanometer Features" Micro- and Nanotechnology: Materials, Processes, Packaging, and Systems II, February 2005, pp. 256-259.

17. Peter C. A. Alberius, Karen L. Frindell, Ryan C. Hayward, Edward J. Kramer, Galen D. Stucky, and Bradley Chmelka. "General Predictive Synthesis of Cubic, Hexagonal, and Lamellar Silica and Titania Mesostructured Thin Films" Chem. Mater. 2002, 14, pp. 3284-3294.

18. Dongjuan Zhao, Peidong Yang, Nick Melosh, Jianglin Feng, Bradley F. Chmelka, and Galen D. Stucky. "Continuous Mesoporous Silica Films with Highly Ordered Large Pore Structures" Adv. Mater. 1998, 10, No. 16, pp. 1380-1385.

The invention claimed is:

1. A method for producing an inorganic film having pores oriented normal to the plane of a surface of the film, comprising;
   forming a pattern of contrasting hydrophobicity and/or hydrophilicity on the film surface;
   growing an inorganic/organic composite layer, by inorganic/organic co-self-assembly, on the patterned surface, in which the composite layer comprises any polymer or surfactant templated hexagonal patterned material grown on any polymer or surfactant templated cubic patterned material, whereby the composite can conform to the surface pattern to form vertically oriented pore structures; and
   treating the composite to remove the organic part of the composite to form a pattern of pores corresponding in location to said pattern.

2. The method of claim 1 in which the surface pattern is made up of hydrophobic patches on a hydrophilic film surface.

3. The method of claim 1 in which the surface pattern is made up of hydrophilic patches on a hydrophobic film surface.

4. The method of claim 1 in which the inorganic/organic composite is formed by self-assembly.

5. The method of claim 1 in which the components are formed by crosslinking, then calcining, the self-assembled components.

6. The method of claim 1 in which the film surface is flat.

7. The method of claim 1 in which the composite layer comprises silica on a titania patterned surface.

8. The method of claim 1 in which the film is an oxide film.

9. A method for producing an inorganic film having pores oriented normal to the plane of a surface of the film, comprising;
   forming a pattern of contrasting hydrophobicity and/or hydrophilicity on the film Surface;
   growing an inorganic/organic composite layer, by inorganic/organic co-self-assembly, on the patterned surface whereby the composite can conform to the surface pattern to form vertically oriented pore structures, in which the surface pattern is formed from a cubic patterned self-assembled material, and in which the vertically oriented pore structures are hexagonally arranged, the surface pattern on the film being hexagonal with a close lattice match to the composite; and
   treating the composite to remove the organic part of the composite to form a pattern of pores corresponding in location to said pattern.

10. The method of claim 9 in which the film is an oxide film.

11. A method for producing an inorganic film having hexagonally arranged pores vertically oriented normal to the plane of a surface of the film, comprising;
    forming a pattern from a cubic patterned self-assembled material on the film surface, the pattern having contrasting hydrophobicity and hydrophilicity, and crosslinking the components to form a flat surface;
    growing an inorganic/organic composite, by inorganic/organic co-self-assembly, on the patterned surface whereby the composite can conform to the surface pattern to form the vertically oriented pore structure, the surface pattern on the film having a close lattice match to the composite; and
    selectively removing one component of the composite to form a pattern of pores corresponding in location to said pattern of components.

12. The method of claim 11 in which the pattern on the film surface is hexagonal.

13. The method of claim 11 in which the film is an oxide film.

14. A method for producing an inorganic film having pores oriented normal to the plane of a surface of the film, comprising;
    forming a pattern of contrasting hydrophobicity and/or hydrophilicity on the film surface;
    growing an inorganic/organic composite layer, by inorganic/organic co-self-assembly, on the patterned surface whereby the composite can conform to the surface pattern to form vertically oriented pore structures, in which the vertically oriented pore structures are hexagonally arranged, the surface pattern on the film being hexagonal with a close lattice match to the composite; and
    treating the composite to remove the organic part of the composite to form a pattern of pores corresponding in location to said pattern.

15. The method of claim 14 in which the composite layer comprises any polymer or surfactant templated hexagonal patterned material grown on any hexagonal surface pattern produced through self-assembly.

16. The method of claim 14 in which the film is an oxide film.

17. The method of claim 14 in which the surface pattern is made up of hydrophobic patches on a hydrophilic film surface.

18. The method of claim 14 in which the surface pattern is made up of hydrophilic patches on a hydrophobic film surface.

19. The method of claim 14 in which the components are formed by crosslinking, then calcining, the self-assembled components.

20. The method of claim 14 in which the composite layer comprises silica on a titania patterned surface.

* * * * *

UNITED STATES PATENT AND TRADEMARK OFFICE
CERTIFICATE OF CORRECTION

PATENT NO.        : 8,399,057 B2
APPLICATION NO.   : 11/449465
DATED             : March 19, 2013
INVENTOR(S)       : Tolbert et al.

It is certified that error appears in the above-identified patent and that said Letters Patent is hereby corrected as shown below:

IN THE SPECIFICATION

In column 1, line 15-21, delete

"This invention was sponsored by: the Office of Naval Research under Grant Nos. N00014-04-1-0410 and N00014-01-1-0737; National Science Foundation Grant No. CHE-0527015; and National Science Foundation-Integrative Graduate Education and Research Traineeship Grant No. DGE 0114443. The Government may have certain rights to this invention."

Should read,

-- This invention was made with Government support under Grant Nos. 0114443, 0307322, and 0527015 awarded by the National Science Foundation, and N00014-01-1-0737 and N00014-04-1-0410 awarded by the U.S. Navy, Office of Naval Research. The Government has certain rights in this invention. --

Signed and Sealed this
Fifteenth Day of October, 2013

Teresa Stanek Rea
*Deputy Director of the United States Patent and Trademark Office*